(12) United States Patent
Hoshi (10) Patent No.: US 7,031,072 B2
(45) Date of Patent: Apr. 18, 2006

(54) ZOOM LENS SYSTEM AND AN IMAGE PICKUP APPARATUS INCLUDING THE SAME

(75) Inventor: Koji Hoshi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 11/133,871

(22) Filed: May 19, 2005

(65) Prior Publication Data

US 2005/0264896 A1    Dec. 1, 2005

(30) Foreign Application Priority Data

May 31, 2004    (JP)    ............................. 2004-161584

(51) Int. Cl.
G02B 15/14    (2006.01)
(52) U.S. Cl. ...................... 359/687; 359/686
(58) Field of Classification Search ......... 359/676–687
See application file for complete search history.

(56) References Cited

U.S. PATENT DOCUMENTS

| | | | |
|---|---|---|---|
| 4,662,723 A | 5/1987 | Imai | 359/680 |
| 4,687,302 A | 8/1987 | Ikemori et al. | 359/686 |
| 4,733,952 A | 3/1988 | Fujioka | 359/681 |
| 4,936,661 A | 6/1990 | Betensky et al. | 359/692 |
| 4,955,700 A | 9/1990 | Yamaguchi | 359/689 |
| 5,434,710 A | 7/1995 | Zozawa | 359/689 |
| 5,793,534 A | 8/1998 | Gang | 359/689 |
| 5,940,221 A | 8/1999 | Okayama et al. | 359/687 |
| 5,963,378 A | 10/1999 | Tochigi et al. | 359/687 |
| 6,124,984 A | 9/2000 | Shibayama et al. | 359/689 |
| 6,166,864 A | 12/2000 | Horiuchi | 359/687 |
| 6,353,506 B1 * | 3/2002 | Ohashi | 359/687 |
| 6,490,096 B1 | 12/2002 | Miyano | 359/684 |
| 6,646,814 B1 * | 11/2003 | Uzawa et al. | 359/687 |
| 6,839,185 B1 | 1/2005 | Ohashi | 359/689 |
| 6,870,688 B1 | 3/2005 | Obama | 359/680 |
| 6,888,684 B1 | 5/2005 | Toyama | 359/687 |
| 2005/0068637 A1 | 3/2005 | Suzuki | 359/689 |
| 2005/0094285 A1 | 5/2005 | Ohashi | 359/680 |

FOREIGN PATENT DOCUMENTS

| | | |
|---|---|---|
| JP | 60-31110 A | 2/1985 |
| JP | 60-150019 A | 8/1985 |
| JP | 61-221719 A | 10/1986 |
| JP | 2-63007 A | 3/1990 |
| JP | 7-77655 A | 3/1995 |
| JP | 7-270684 A | 10/1995 |
| JP | 7-318804 A | 12/1995 |
| JP | 8-179209 A | 7/1996 |
| JP | 8-292369 A | 11/1996 |

(Continued)

Primary Examiner—Ricky L. Mack
Assistant Examiner—M. Hasan
(74) Attorney, Agent, or Firm—Canon U.S.A., Inc.

(57) ABSTRACT

At least one exemplary embodiment provides a zoom lens system having multiple lens units (e.g. four) and variable optical power, which's configuration may reduce the size of a zoom lens system. In one exemplary embodiment the zoom lens system can include four lens units, a first lens unit, a second lens unit, a third lens unit, and a fourth lens unit. The lens units can be configured in accordance with at least one exemplary embodiment so that they have various positive and negative optical powers and where the distances between at least two of the lens units changes during a zooming process.

15 Claims, 7 Drawing Sheets

FOREIGN PATENT DOCUMENTS

| | | |
|---|---|---|
| JP | 8-320435 A | 12/1996 |
| JP | 9-113809 A | 5/1997 |
| JP | 10-104520 A | 4/1998 |
| JP | 11-23967 A | 1/1999 |
| JP | 11-211985 A | 8/1999 |
| JP | 11-305124 A | 11/1999 |

* cited by examiner

ZOOM LENS SYSTEM AND AN IMAGE PICKUP APPARATUS INCLUDING THE SAME

BACKGROUND OF THE INVENTION

1. Field of the Invention

The invention relates in general to a zoom lens system and more specifically but not exclusively to a zoom lens system used in optical photographic systems.

2. Description of the Related Art

Recently, image pickup apparatuses, such as video cameras and digital still cameras, including solid-state imaging devices, such as a charge-coupled device (CCD) sensor, have become more sophisticated and smaller in size. Therefore, a photographic optical system included in such a sophisticated and small-sized image pickup apparatus must also have high optical performance and be small in size.

A zoom lens included in a conventional image pick up apparatus has a four-unit structure comprising a first to a fourth lens unit disposed in order from the object side to the image side of the zoom lens system. The first lens unit has a positive refractive power and does not move during zooming and focusing. The second lens unit has a negative refractive power and moves along the optical axis for magnification. The third lens unit has a positive refractive power and does not move during zooming and focusing. The fourth lens unit has a positive refractive power and moves during zooming and focusing. (Refer to Japanese Patent Laid-Open Nos. 7-270684 (corresponding to at least one exemplary embodiment of U.S. Pat. No. 5,963,378), 7-318804 (corresponding to U.S. Pat. No. 5,963,378), 8-292369 (corresponding to U.S. Pat. No. 5,940,221), and 11-305124 (corresponding to at least one exemplary embodiment of U.S. Pat. No. 6,166,864).

In such a four-unit zoom lens, the first lens unit comprises a cemented lens, formed by bonding a negative/positive lens combination with a positive lens. The second lens unit comprises two negative lenses and a positive lens. The third lens unit comprises one or two positive lenses and a negative lens. An aperture stop is disposed immediately before the third lens unit.

Because recently the size of image pickup apparatuses has been reduced and pixel size has been minimized due to high resolution solid-state imaging devices, photographic optical systems used for such apparatuses are required to have high optical performance with a small zoom lens system having a short overall length. Many optical photographic systems (e.g. video cameras) are subject to the same high-quality still image recording requirements, thus a lens system having improved optical performance would be useful in such optical photographic systems (e.g. video cameras).

Typically, the overall size of a zoom lens system can be reduced by increasing the refractive power of the lens units because, in this way, the lens units will be required to move shorter distances in order to obtain a predetermined zooming ratio.

However, when the refractive powers of the lens units are simply increased, the variation in aberration that occurs during zooming also increases. Thus, it becomes difficult to obtain satisfactory optical performance for the entire zooming range. Furthermore, the required degree of accuracy in the production process increases, and mass production becomes difficult.

SUMMARY OF THE INVENTION

At least one exemplary embodiment provides a desired zooming ratio, with the overall size of the lens system reduced, and the optical performance of the lens system increased.

At least one further exemplary embodiment provides a zoom lens system which includes a first lens unit having a positive refractive power (i.e., optical power, which is equal to an inverse of the focal length), a second lens unit having a negative refractive power, a third lens unit having a positive refractive power, and a fourth lens unit having a positive refractive power. The first to fourth lens units are disposed in the relative order. The distances between the lens units can change during zooming. The lenses included in the second and third lens units can be structured so that they have appropriate refractive powers and are made of appropriate materials and known by one of ordinary skill.

At least one further exemplary embodiment provides a zoom lens system satisfying particular values of a L/S ratio and ν2p value, for example, L/S<0.85 and $$\nu 2p < 21.9$$

where S represents the distance between the surface on the image side of the positive lens having the strongest refractive power among the lenses included in the second lens unit and the aperture stop disposed on the image side of the second lens unit, at the telephoto end, L represents the distance between the same surface on the image side and the surface of a lens closest to the object among lenses included in the third lens unit, and ν2p represents the Abbe number of the positive lens having the strongest refractive power among the lenses included in the second lens unit.

At least one further exemplary embodiment provides for a zoom lens system providing a range of focal length ratios f2p/f2n, for example, −1.7<f2p/f2n<−0.45 and $$\nu 2p < 21.9$$

where f2n represents the focal length of a negative lens having the strongest refractive power among lenses included in the second lens unit, f2p represents the focal length of a positive lens having the strongest refractive power among lenses included in the second lens unit, and ν2p represents the Abbe number of the positive lens having the strongest refractive power among the lenses included in the second lens unit.

Yet at least one further exemplary embodiment provides for a zoom lens system providing a range of focal length ratios f3p/f3n, for example, −1.5<f3p/f3n<−0.35 and $$\nu 3n < 21.9$$

where f3p represents the focal length of a positive lens having the strongest refractive power among lenses included in the third lens unit, f3n represents the focal length of a negative lens having the strongest refractive power among lenses included in the third lens unit, and ν3n represents the Abbe number of the negative lens having the strongest refractive power (having the largest absolute value for refractive power) among the lenses included in the third lens unit.

Further features of exemplary embodiments will become apparent from the following descriptions (with reference to the attached drawings).

DESCRIPTION OF THE EMBODIMENTS

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g. glass, Si). Additionally the actual size of the lens may not be discussed however any size from macro lenses to micro and nano lenses are intended to lie within the scope of exemplary embodiments (e.g. lenses with diameters of nanometer size, micro size, centimeter, and meter sizes). Additionally exemplary embodiments are not limited to visual optical photographic systems, for example the system can be designed for use with infrared and other wavelengths photographic systems.

A zoom lens system in accordance with at least a few exemplary embodiments will be described with reference to the drawings.

Figure 1:
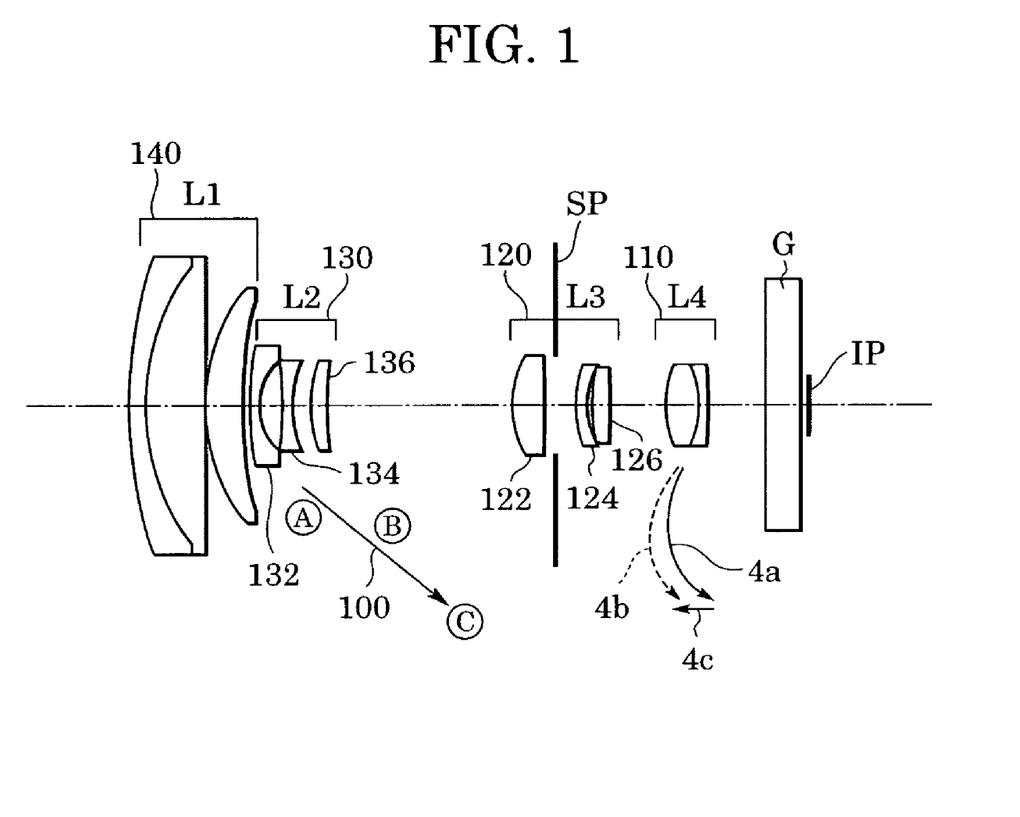
FIG. 1 illustrates a cross-sectional view of a zoom lens system according to at least one exemplary embodiment.
Figure 2A:
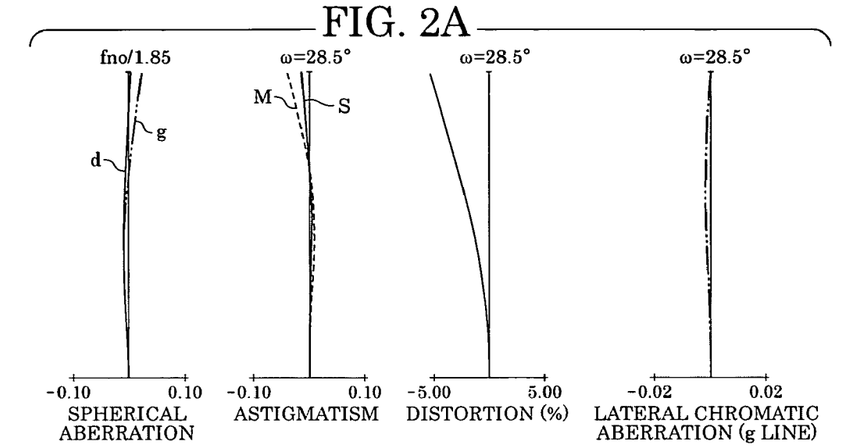
FIGS. 2A–2C illustrate the various aberrations, astigmatism, and distortion of a zoom lens system according to the exemplary embodiment shown in FIG. 1.
Figure 2B:
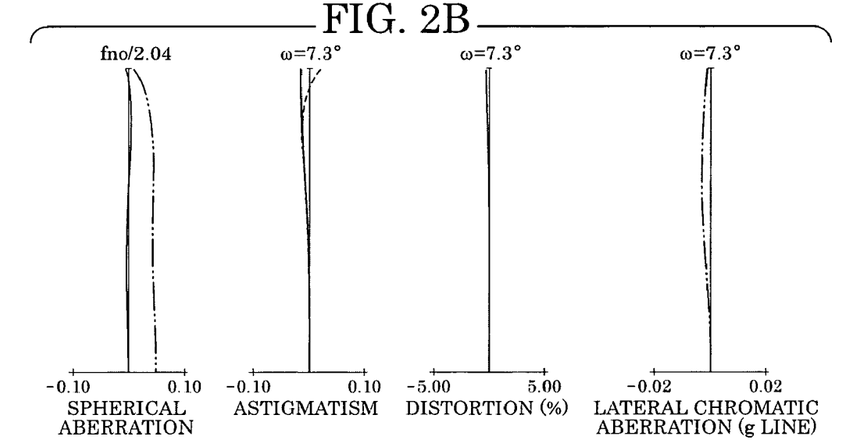
Figure 2C:
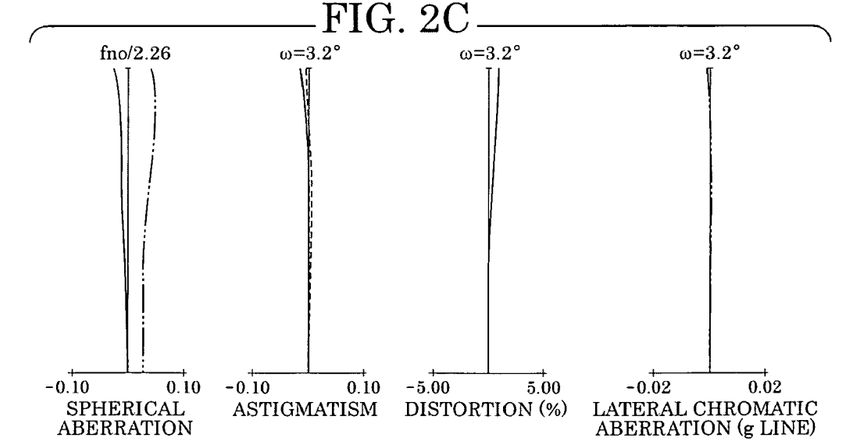
Figure 3:
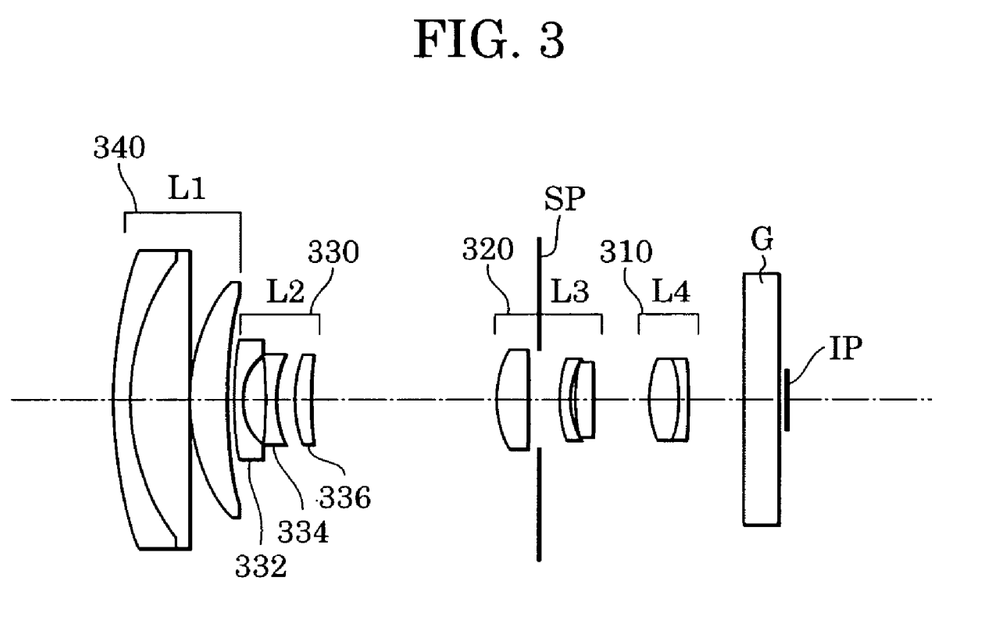
FIG. 3 illustrates a cross-sectional view of a zoom lens system according to at least one further exemplary embodiment.
Figure 4A:
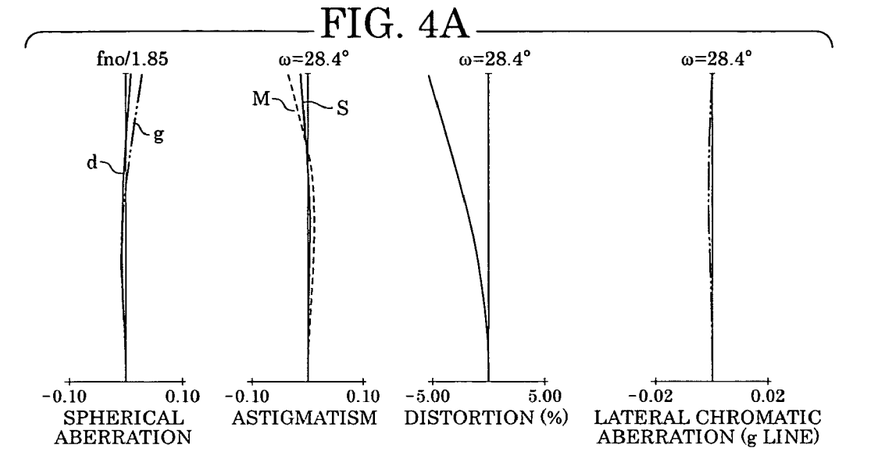
FIGS. 4A–4C illustrates the various aberrations, astigmatism, and distortion of the zoom lens system according to the exemplary embodiment shown in FIG. 3.
Figure 4B:
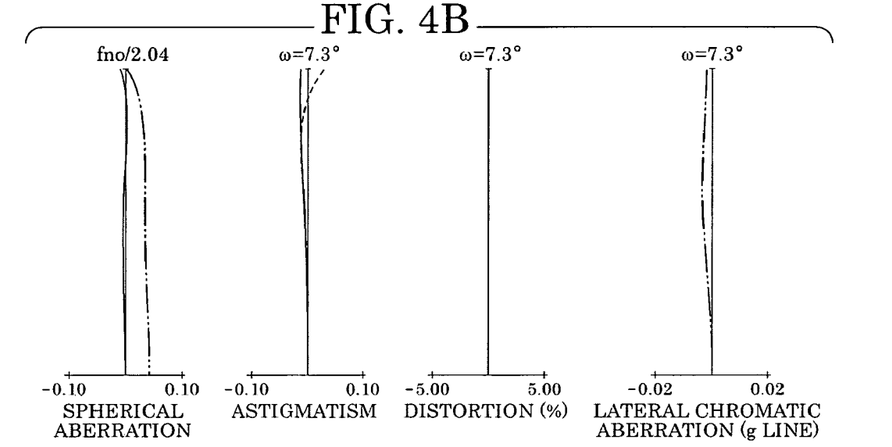
Figure 4C:
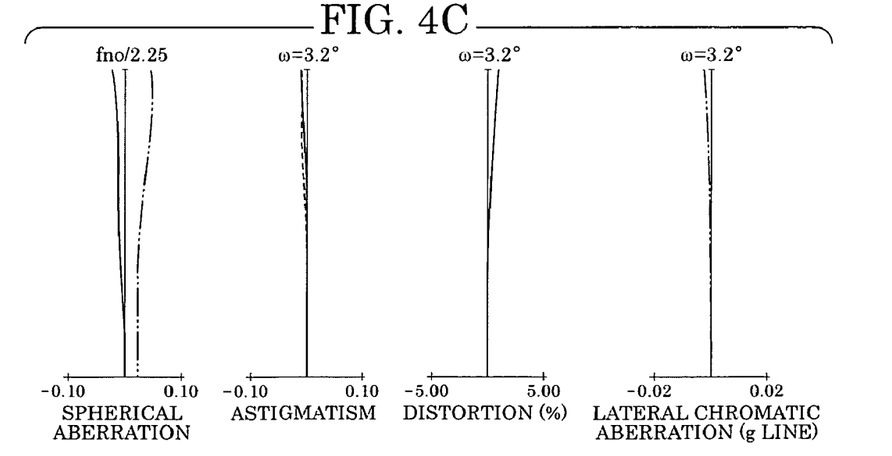
Figure 5:
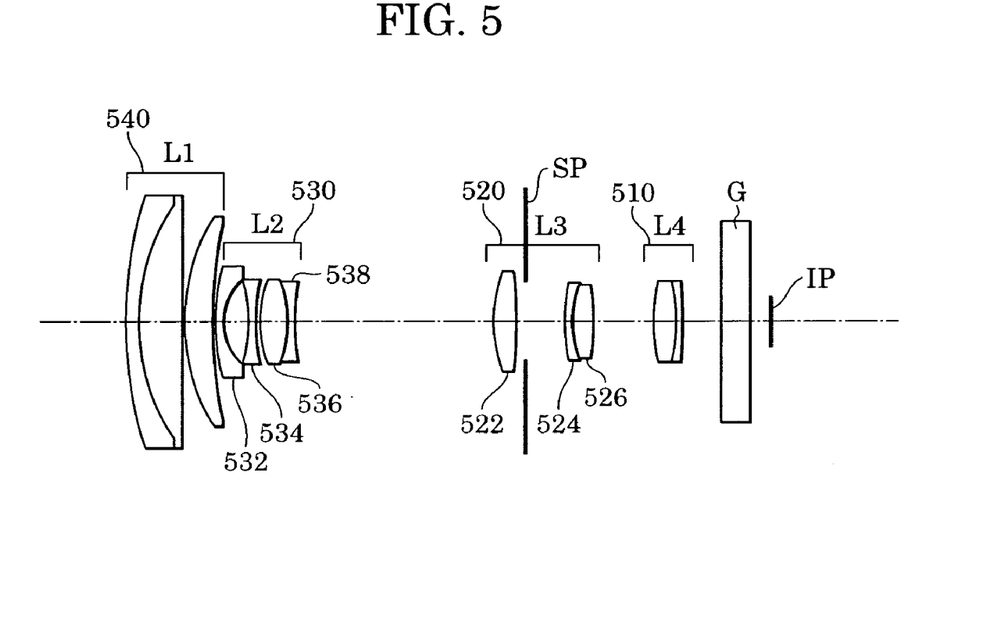
FIG. 5 illustrates a cross-sectional view of a zoom lens system according to at least one further exemplary embodiment.
Figure 6A:
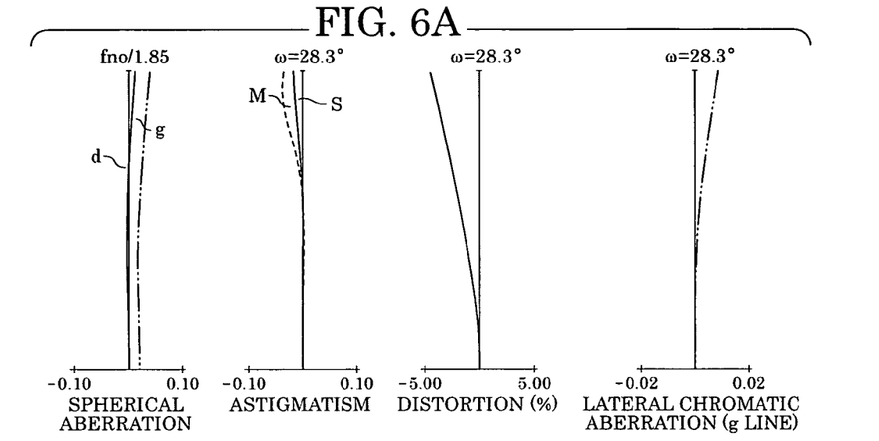
FIGS. 6A–6C illustrates the various aberrations, astigmatism, and distortion of the zoom lens system according to the exemplary embodiment shown in FIG. 5.
Figure 6B:
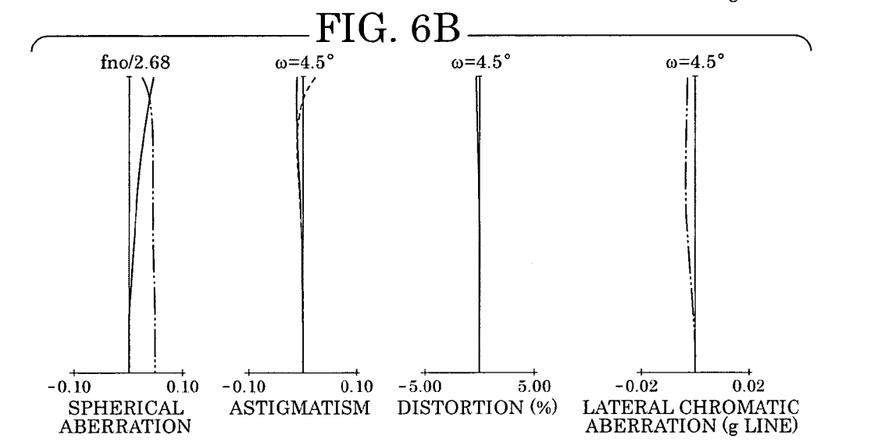
Figure 6C:
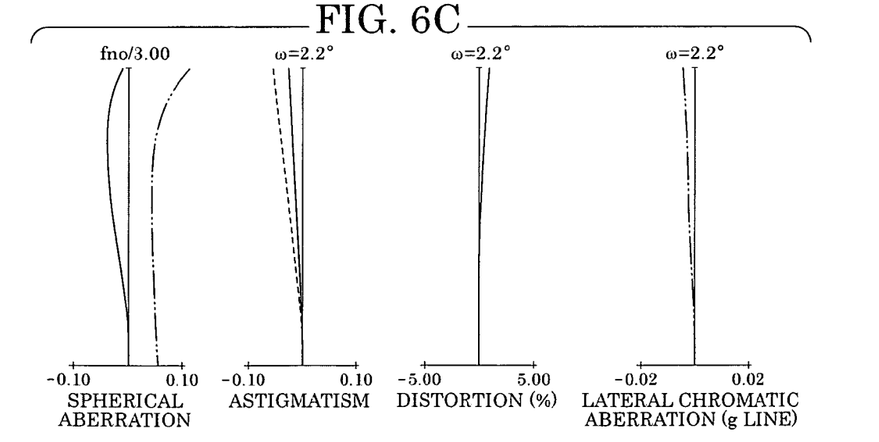

FIGS. 1, 3, and 5 are cross-sectional views of zoom lens systems in accordance with first, second, and third exemplary embodiments, respectively. FIGS. 2A–2C, 4A–4C, and 6A–6C illustrate the various aberrations, astigmatism, and distortion of the zooms lens systems according to the first, second, and third exemplary embodiments, respectively, where the horizontal axis shows the amount of aberrations, astigmatism, and distortion, and where the vertical axis shows the radius of entrance pupil or an ideal image height. Note that three exemplary embodiments are shown, however the invention is not limited to these three examples, and embodiments within the gist of the description and equivalents are intended to fall with the scope of at least one exemplary embodiment. FIGS. 2A, 4A, and 6A illustrate optical conditions of the lens system at the wide-angle end (e.g. position (A) illustrated in FIG. 1). FIGS. 2B, 4B, and 6B illustrate optical conditions of the lens system at an intermediate zoom position (e.g. position (B) illustrated in FIG. 1). FIGS. 2C, 4C, and 6C illustrate optical conditions of the lens system at the telephoto end (e.g. position (C) illustrated in FIG. 1).

Where a cross-sectional view is illustrated, the left of each cross-sectional view of the lens system is the side toward the object (front side of a camera) and the right is the side toward the image (rear side of a camera). Each figure illustrating a cross-section including lens units that can have various positive and negative refractive powers. In at least one exemplary embodiment a cross-section can include a first lens unit L1 having a positive refractive power (i.e., optical power, which is equal to an inverse of the focal length), a second lens unit L2 having a negative refractive power, a third lens unit L3 having a positive refractive power, and a fourth lens unit L4 having a positive refractive power. An aperture stop SP is provided. A glass block G can be disposed to correspond to the parallel plates disposed in the light path of an optical low-pass filter, an infrared ray filter, and a cover glass. An image plane IP represents where the photosurface of an imaging device is disposed (e.g. a solid-state imaging device, such as a CCD sensor or a complementary metal-oxide semiconductor (CMOS) sensor).

In FIGS. 2A–2C, 4A–4C, and 6A–6C, illustrating the various aberrations, astigmatisms and distortions, the reference characters d and g represent the d-line and g-line, respectively, where the lateral chromatic aberration is indicated by the g-line and the d-line indicates the bright line spectrum of a He atom. The drawings also illustrate meridional image surfaces M and sagittal image surfaces S.

In at least one exemplary embodiment, zooming of the zoom lens system can be carried out from movement of lens units from the wide-angle end (e.g. position (A) in FIG. 1) to the telephoto end (e.g. position (C) in FIG. 1). Magnification can be carried out by moving the second lens unit L2 to the image side, (e.g. as indicated by arrow 100 in FIG. 1). The movement of the image plane accompanying the magnification can be corrected by moving the fourth lens unit L4 to the object side along a convex trajectory (e.g. as indicated by the arrows 4a and 4b in FIG. 1).

In at least one exemplary embodiment the first lens unit L1 and the third lens unit L3 do not move during zooming and focusing. By keeping the first lens unit L1 fixed during zooming, the size of the support structure (e.g. a barrel structure) supporting the first lens unit L1 can be reduced, where a reduced structure can have a strong resistance against static pressure. Likewise by keeping the third lens unit L3 fixed during zooming, the structure (e.g. a barrel structure) supporting the third lens unit is simplified and the size of the support structure is reduced. Additionally, by reducing the size of the support structure one can reduce any axial displacements.

Note that although general movements and characteristics (e.g. positive and negative refractive power) of lens units are discussed generally with respect to the lens unit number (e.g. first lens unit L1; second lens unit L2; third lens unit L3; and the fourth lens unit L4) the lens unit numbers in FIGS. 1, 3, and 5 are general designations only and are not meant to imply that the first lens unit L1 in FIG. 1 is the same as the first lens unit L1 in FIG. 3. To emphasize this, separate reference numerals have been applied to the Figures (e.g. the first lens unit L1 of the exemplary embodiment illustrated in FIG. 1 is 140 whereas the first lens unit L1 of the exemplary embodiment illustrated in FIG. 3 is 340). Thus in summary, although in the discussion a lens unit (e.g. L1) may be referred to generally (e.g. by L1), the various lens units can include lens elements, and the various exemplary embodiments of the lens units can have a different number of lens elements and different lens element characteristics. For example, the second lens unit L2 in the embodiment illustrated in FIG. 1 includes three lens elements (e.g. 132, 134, and 136) whereas the second lens unit L2 of the embodiment shown in FIG. 5 has four lens elements (e.g. 532, 534, 536, and 538).

In at least one exemplary embodiment the zoom lens system employs a rear focusing system in which the fourth lens unit L4 is moved along the optical axis, for example as illustrated in FIG. 1 by a solid line 4a and a dotted line 4b. The solid line 4a represents the trajectory of the fourth lens unit L4 110 for correcting the imaging plane variation when zooming from the wide-angle end to the telephoto end to focus on an object at an infinite distance. The dotted line 4b represents the trajectory of the fourth lens unit L4 110 for correcting the imaging plane variation when zooming from the wide-angle end to the telephoto end to focus on an object at a close distance. By moving the fourth lens unit L4 (e.g. 110 in FIG. 1; 310 in FIG. 3; and 510 in FIG. 5) along a convex trajectory to the object side, the space between the third lens unit L3 (e.g. 120 in FIG. 1; 320 in FIG. 3; and 520 in FIG. 5) and the fourth lens unit L4 (e.g. 110 in FIG. 1; 310 in FIG. 3; and 510 in FIG. 5) may be used effectively, thus reducing the overall length of the lens system. Additionally in at least one exemplary embodiment by using the fourth lens unit L4, which can have a reduced diameter, for focusing, the load applied to the actuator can be reduced and the speed of focusing can be increased.

In at least one exemplary embodiment utilizing a telephoto feature to focus an object at an infinite distance to an object at a close distance, the fourth lens unit L4 can be moved forwards (e.g. as indicated by a straight line 4c in FIG. 1) in the cross-sectional view of the lens system. Note that although movements are shown in FIG. 1, similar movements (e.g. 100, 4a, 4b, and 4c) are available in at least a few other exemplary embodiments (e.g. the exemplary embodiments illustrated in FIGS. 3 and 5).

In at least one exemplary embodiment, an imaging element disposed on the image plane IP can have an optical performance corresponding to a solid-state imaging device having various cell pitches in accordance with design needs (e.g. a cell pitch of about 2 to 3 micrometers).

In at least a few exemplary embodiments (e.g. exemplary embodiments illustrated in FIGS. 1 and 3) the second lens unit L2 (e.g. 130; 330) can include a negative lens 2G1 (e.g. 132; 332), a negative lens 2G2 (e.g. 134; 334), and a positive lens 2G3 (e.g. 136; 336), where the lenses are disposed in the stated order from the object side to the image side. In at least one exemplary embodiment, the second lens unit L2 (530) can include a negative lens 2G1 (532), a negative lens 2G2 (534), a positive lens 2G3 (536), and a negative lens 2G4 (538), wherein the lenses are disposed in the stated order from the object side to the image side. By structuring the second lens unit L2 as described above, variation in the aberration that occurs during zooming can be suppressed and the size of the zoom lens system can be reduced while obtaining a larger zooming ratio.

In at least one exemplary embodiment (e.g. the exemplary embodiments illustrated in FIGS. 1 and 5), the third lens unit L3 includes a positive lens 3G1 (e.g. 122; 522), a negative lens 3G2 (e.g. 124; 524), and a positive lens 3G3 (e.g. 126; 526), where these lenses are disposed in the respective order from the object side to the image side. The aperture stop SP is interposed between the positive lens 3G1 (e.g. 122; 522) and the negative lens 3G2 (e.g. 124; 524). Conventional four-lens-unit zoom lens systems often have the aperture stop SP disposed immediately before the third lens unit L3, and therefore, the movement of the second lens unit L2 is limited because the aperture stop SP blocks the second lens unit L2. In the exemplary embodiments where the aperture stop SP is disposed in the third lens unit L3, the space required for zooming can be effectively used. Accordingly, the zooming ratio can be increased compared to conventional zoom lens systems and/or the overall length of the lens system can be reduced.

In at least one exemplary embodiment (e.g. the exemplary embodiments illustrated in FIGS. 1 and 5) the zoom lens system can satisfy certain design values. For example, in at least one exemplary embodiment the zoom lens system can have design values:

$$L/S < 0.85 \quad (1)$$

$$\nu 2p < 21.9 \quad (2)$$

where L represents the distance between the surface closest to the object of a lens of the third lens unit L3 (e.g. 120; 520) and the surface on the image side of a positive lens having strongest refractive power among the positive lenses included in the second lens unit L2 (e.g. 130; 530), S represents the distance at the telephoto end between the aperture stop SP and the surface on the image side of a positive lens having the strongest refractive power among the positive lenses included in the second lens unit L2 (e.g. 130; 530), and ν2p represents the Abbe number of the positive lens having the strongest refractive power among the positive lenses included in the second lens unit L2 (e.g. 130; 530).

In the description above, "having the strongest refractive power" refers to the largest absolute value of the refractive power.

In at least one exemplary embodiment (e.g. the exemplary embodiment illustrated in FIG. 5) the zoom lens system can have various design values, for example:

$$-1.7 < f2p/f2n < -0.45 \quad (3)$$

$$-1.5 < f3p/f3n < -0.35 \quad (4)$$

$$\nu 3n < 21.9 \quad (5)$$

where f2p represents the focal length of the positive lens having the strongest refractive power among the positive lenses included in the second lens unit L2 (e.g. 530), and f2n represents the focal length of the negative lens having the strongest refractive power among the negative lenses included in the second lens unit L2 (e.g. 530), f3p represents the focal length of the positive lens having the strongest refractive power among the positive lenses included in the third lens unit L3 (e.g. 520), f3n represents the focal length of the negative lens having the strongest refractive power among the negative lenses included in the third lens unit L3, and ν3n represents the Abbe number of the negative lens having the strongest refractive power among the negative lenses included in the third lens unit L3 (e.g. 520).

A synopsis of formulas (1) through (5) are provided below.

Formula (1) relates to the distance between the third lens unit L3 and the surface on the image side of the positive lens 2G3, which is the lens having the strongest positive refractive power among the lenses included in second lens unit L2, and the distance between the aperture stop SP and the surface on the image side of the positive lens 2G3. When L/S increases, either the distance between the positive lens 2G3 and the third lens unit L3 can become larger, causing the overall length of the lens system to become large, or, the distance between the positive lens 2G3 and the aperture stop SP can become smaller. Thus, reducing the ability of the positive lens 2G3, which is the lens having strongest positive refractive power among the lenses included in the second lens unit L2, to correct lateral chromatic aberration. The value of the upper limit of formula (1) can vary in exemplary embodiments depending on the design situation (e.g. 0.85; 0.45).

Formula (2) relates to the Abbe number of the positive lens 2G3, which is the lens having the strongest positive refractive power among the lenses included in the second lens unit L2. The value of ν2p can vary in exemplary embodiments, however when the value increases it may become more difficult to correct the variation in the longitudinal chromatic aberration.

Formula (3) relates to the ratio of the refractive power of the positive lens 2G3, which is the lens having the strongest positive refractive power among the lenses included in the second lens unit L2, to the refractive power of the negative lens 2G1, which is the lens having the strongest negative refractive power among the lenses included in the second lens unit L2. Exemplary embodiments can have various values of f2p/f2n, however when the value decreases (e.g. −1.2; −1.7), the refractive power of the positive lens 2G3 may be reduced and thus, it may become more difficult to correct the longitudinal chromatic aberration. When the value of f2p/f2n increases (e.g. − 0.45; −0.64), the refractive power of the positive lens 2G3 may increase and the performance of the lens system may be reduced (e.g. due to possible positional errors and surface accuracy of the positive lens 2G3).

In at least one exemplary embodiment the lens units satisfy the range of Formulas (2) and (3), providing a lens system that can suppress or reduce the variation of the longitudinal chromatic aberration that occurs during zooming.

Formula (4) relates to the ratio of the refractive power of the positive lens 3G1, which is the lens having the strongest positive refractive power among the lenses included in the third lens unit L3, to the refractive power of the negative lens 3G2, which is the lens having the strongest negative refractive power among the lenses included in the third lens unit L3. Exemplary embodiments can have various values of f3p/f3n, however when the value increases (e.g. −0.35; −0.44) the refractive power of the negative lens 3G2 may be reduced and thus, it may become difficult to correct the longitudinal chromatic aberration. When the value of f3p/f3n is reduced (e.g. −1.5; −0.98), the refractive power of the negative lens 3G2 may increase and the performance of the lens system may be reduced (e.g. due to the positional error and surface accuracy of the negative lens 3G2).

Formula (5) relates to the Abbe number of the negative lens 3G2, which is the lens having the strongest negative refractive power among the lenses of the third lens unit L3. In at least one exemplary embodiment the lens units satisfy the range of Formulas (4) and (5), providing suppression or reduction of the variation in the longitudinal chromatic aberration that can occur during zooming. When the values of ν3n increase, the ability to correct the longitudinal chromatic aberration that occurs during zooming can be reduced. Although discussion herein refers to reduction of the "variation" of distortions and aberrations, reduction of the distortions and aberrations themselves, without necessarily reducing the "variation" is intended to fall with the intended scope of at least one exemplary embodiment.

Although some exemplary embodiments fall with the ranges of formulas (1) through (5), other exemplary embodiments may fall within only some of the ranges or none of the ranges and the discussion herein should not be interpreted to limit exemplary embodiments to within the ranges of formulas (1) through (5).

Three examples of lens units are illustrated in FIGS. 1, 3, and 5 in accordance with at least three exemplary embodiments. For illustrative purposes only samples of lens unit values for the examples are provided below:

The numerical data corresponding to the lens systems according the first (e.g. as illustrated in FIG. 1) to third (e.g. as illustrated in FIG. 5) exemplary embodiments are shown as numerical examples below. In the numerical examples, f represents the focal length, Fno represents the F number, ω represents the half field angle, i represents the number of lens surfaces counted from the object side, ri represents the radius of curvature of the ith surface, di represents the axial distance between the ith surface and the (i+1)th surface, ni represents the d-line index of refraction of the material the ith surface is composed of, and νi represent the d-line Abbe number of the material the ith surface is composed of.

The shape of an aspherical surface is represented by the following formula:

$$x = \frac{(1/R)h^2}{1 + \sqrt{\{1 - (1 + K)(h/R)^2\}}} + Bh^4 + Ch^6 + Dh^8 + Eh^{10}$$

where light travels in a positive direction, X represent the displacement from the surface apex in the optical axis direction, h represent the height from the optical axis of a point perpendicular to the optical axis, R represents the paraxial radius of curvature, K represents the conic constant, and B, C, D, and E are aspherical coefficients.

In the following, "e±Z" is equivalent to "×10$^{±Z}$."

Examples of the relationships between the formulae indicated above and several numerical examples (listed below) in accordance with at least one exemplary embodiment are shown in Table 1.

| (First numeral example) | | | |
|---|---|---|---|
| f = 4.61 to 44.51   FNo = 1: 1.85 to 2.26   2ω = 56.9° to 6.4° | | | |
| r1 = 38.786 | d1 = 1.20 | n1 = 1.84666 | ν1 = 23.9 |
| r2 = 19.031 | d2 = 4.60 | n2 = 1.69680 | ν2 = 55.5 |
| r3 = 1433.938 | d3 = 0.17 | | |
| r4 = 17.190 | d4 = 2.86 | n3 = 1.69680 | ν3 = 55.5 |
| r5 = 46.412 | d5 = variable | | |
| r6 = 37.651 | d6 = 0.70 | n4 = 1.83481 | ν4 = 42.7 |
| r7 = 5.925 | d7 = 1.81 | | |
| r8 = −16.833 | d8 = 0.70 | n5 = 1.77250 | ν5 = 49.6 |
| r9 = 9.130 | d9 = 1.59 | | |
| r10 = 12.637 | d10 = 1.20 | n6 = 1.92286 | ν6 = 18.9 |
| r11 = 53.330 | d11 = variable | | |
| r12 = 8.204 (aspherical) | d12 = 2.42 | n7 = 1.58313 | ν7 = 59.4 |
| r13 = −67.411 | d13 = 1.04 | | |
| r14 = ∞ (aperture stop) | d14 = 1.71 | | |
| r15 = 16.480 | d15 = 0.70 | n8 = 1.84666 | ν8 = 23.9 |
| r16 = 7.376 | d16 = 0.47 | | |
| r17 = 16.155 | d17 = 1.30 | n9 = 1.60311 | ν9 = 60.6 |
| r18 = −56.332 | d18 = variable | | |
| r19 = 11.744 | d19 = 2.50 | n10 = 1.69680 | ν10 = 55.5 |
| r20 = −9.481 | d20 = 0.70 | n11 = 1.80518 | ν11 = 25.4 |
| r21 = −39.336 | d21 = variable | | |
| r22 = ∞ | d22 = 2.82 | n12 = 1.50000 | ν12 = 60.0 |
| r23 = ∞ | | | |
| Focal length | 4.61 | 19.53 | 44.51 |

-continued (First numeral example)

Variable distance

|     |       |       |       |
| --- | ----- | ----- | ----- |
| d5  | 0.56  | 11.07 | 14.57 |
| d11 | 14.61 | 4.11  | 0.61  |
| d18 | 4.41  | 1.86  | 5.94  |

Aspherical coefficient
Twelfth surface

| K | B | C | D | E |
| --- | --- | --- | --- | --- |
| −9.9537e−01 | −1.7401e−05 | −2.2296e−06 | 1.6753e−07 | −3.7334e−09 |

(Second numeral example)

f = 4.61 to 44.51    FNo = 1: 1.85 to 2.25    2ω = 56.9° to 6.4°

| r1 = 40.910 | d1 = 1.20 | n1 = 1.84666 | ν1 = 23.9 |
| --- | --- | --- | --- |
| r2 = 19.635 | d2 = 4.55 | n2 = 1.69680 | ν2 = 55.5 |
| r3 = −1873.266 | d3 = 0.17 | | |
| r4 = 17.371 | d4 = 2.84 | n3 = 1.69680 | ν3 = 55.5 |
| r5 = 46.270 | d5 = variable | | |
| r6 = 38.944 | d6 = 0.70 | n4 = 1.83481 | ν4 = 42.7 |
| r7 = 5.932 | d7 = 1.86 | | |
| r8 = −15.610 | d8 = 0.70 | n5 = 1.77250 | ν5 = 49.6 |
| r9 = 9.951 | d9 = 1.60 | | |
| r10 = 13.551 | d10 = 1.20 | n6 = 1.92286 | ν6 = 18.9 |
| r11 = 72.871 | d11 = variable | | |
| r12 = 7.926 (aspherical) | d12 = 2.43 | n7 = 1.58313 | ν7 = 59.4 |
| r13 = −137.153 | d13 = 1.10 | | |
| r14 = ∞ (aperture stop) | d14 = 1.78 | | |
| r15 = 16.990 | d15 = 0.70 | n8 = 1.84666 | ν8 = 23.9 |
| r16 = 7.211 | d16 = 0.42 | | |
| r17 = 13.538 | d17 = 1.45 | n9 = 1.60311 | ν9 = 60.6 |
| r18 = −50.098 | d18 = variable | | |
| r19 = 11.466 | d19 = 2.25 | n10 = 1.69680 | ν10 = 55.5 |
| r20 = −11.466 | d20 = 0.50 | n11 = 1.80518 | ν11 = 25.4 |
| r21 = −67.240 | d21 = variable | | |
| r22 = ∞ | d22 = 2.82 | n12 = 1.51633 | ν12 = 64.1 |
| r23 = ∞ | | | |

| Focal length | 4.61 | 19.54 | 44.51 |
| --- | --- | --- | --- |

Variable distance

|     |       |       |       |
| --- | ----- | ----- | ----- |
| d5  | 0.56  | 11.28 | 14.85 |
| d11 | 14.90 | 4.18  | 0.61  |
| d18 | 4.33  | 1.66  | 5.87  |

Aspherical coefficient
Twelfth surface

| K | B | C | D | E |
| --- | --- | --- | --- | --- |
| −7.8438e−01 | −4.8127e−05 | −2.0478e−06 | 1.5028e−07 | −3.2194e−09 |

(Third numeral example)

f = 4.93 to 67.82    FNo = 1: 1.85 to 3.00    2ω = 56.6° to 4.5°

| r1 = 46.218 | d1 = 1.20 | n1 = 1.84666 | ν1 = 23.9 |
| --- | --- | --- | --- |
| r2 = 23.729 | d2 = 4.31 | n2 = 1.69680 | ν2 = 55.5 |
| r3 = −841.125 | d3 = 0.17 | | |
| r4 = 20.216 | d4 = 2.63 | n3 = 1.69680 | ν3 = 55.5 |
| r5 = 43.360 | d5 = variable | | |
| r6 = 24.393 | d6 = 0.70 | n4 = 1.84666 | ν4 = 23.9 |

-continued (Third numeral example)

| r7 = 5.461 | d7 = 2.75 | | |
| --- | --- | --- | --- |
| r8 = −13.852 | d8 = 0.60 | n5 = 1.83400 | ν5 = 37.2 |
| r9 = 27.358 | d9 = 0.42 | | |
| r10 = 12.638 | d10 = 2.56 | n6 = 1.92286 | ν6 = 18.9 |
| r11 = −12.638 | d11 = 0.18 | | |
| r12 = −10.034 | d12 = 0.60 | n7 = 1.74950 | ν7 = 35.3 |
| r13 = 39.730 | d13 = variable | | |
| r14 = 13.131 (aspherical) | d14 = 2.19 | n8 = 1.69350 | ν8 = 53.2 |
| r15 = −47.331 | d15 = 1.26 | | |
| r16 = ∞ (aperture stop) | d16 = 3.67 | | |
| r17 = 21.536 | d17 = 0.65 | n9 = 1.92286 | ν9 = 18.9 |
| r18 = 9.461 | d18 = 0.22 | | |
| r19 = 12.725 | d19 = 1.79 | n10 = 1.48749 | ν10 = 70.2 |
| r20 = −93.334 | d20 = variable | | |
| r21 = 14.705 | d21 = 2.18 | n11 = 1.74400 | ν11 = 44.8 |
| r22 = 14.705 | d22 = 0.60 | n12 = 1.84666 | ν12 = 23.9 |
| r23 = −58.034 | d23 = variable | | |
| r24 = ∞ | d24 = 2.40 | n13 = 1.51633 | ν13 = 64.1 |
| r25 = ∞ | | | |

| Focal length | 4.93 | 33.61 | 67.82 |
| --- | --- | --- | --- |

Variable distance

|     |       |       |       |
| --- | ----- | ----- | ----- |
| d5  | 0.55  | 16.71 | 19.56 |
| d13 | 19.73 | 3.57  | 0.72  |
| d20 | 6.43  | 2.50  | 8.98  |

Aspherical coefficient
Fourteenth surface

| K | B | C | D | E |
| --- | --- | --- | --- | --- |
| −1.2114e+00 | −2.5311e−05 | −1.7785e−07 | 9.1307e−09 | −1.1309e−10 |

TABLE 1

|  | First Numeral Example | Second Numeral Example | Third Numeral Example |
| --- | --- | --- | --- |
| Formula (1) | 0.15 | 0.15 | 0.17 |
| Formula (2) | 18.9 | 18.9 | 18.9 |
| Formula (3) | — | — | −0.85 |
| Formula (4) | — | — | −0.8 |
| Formula (5) | — | — | 18.9 |

Figure 7:
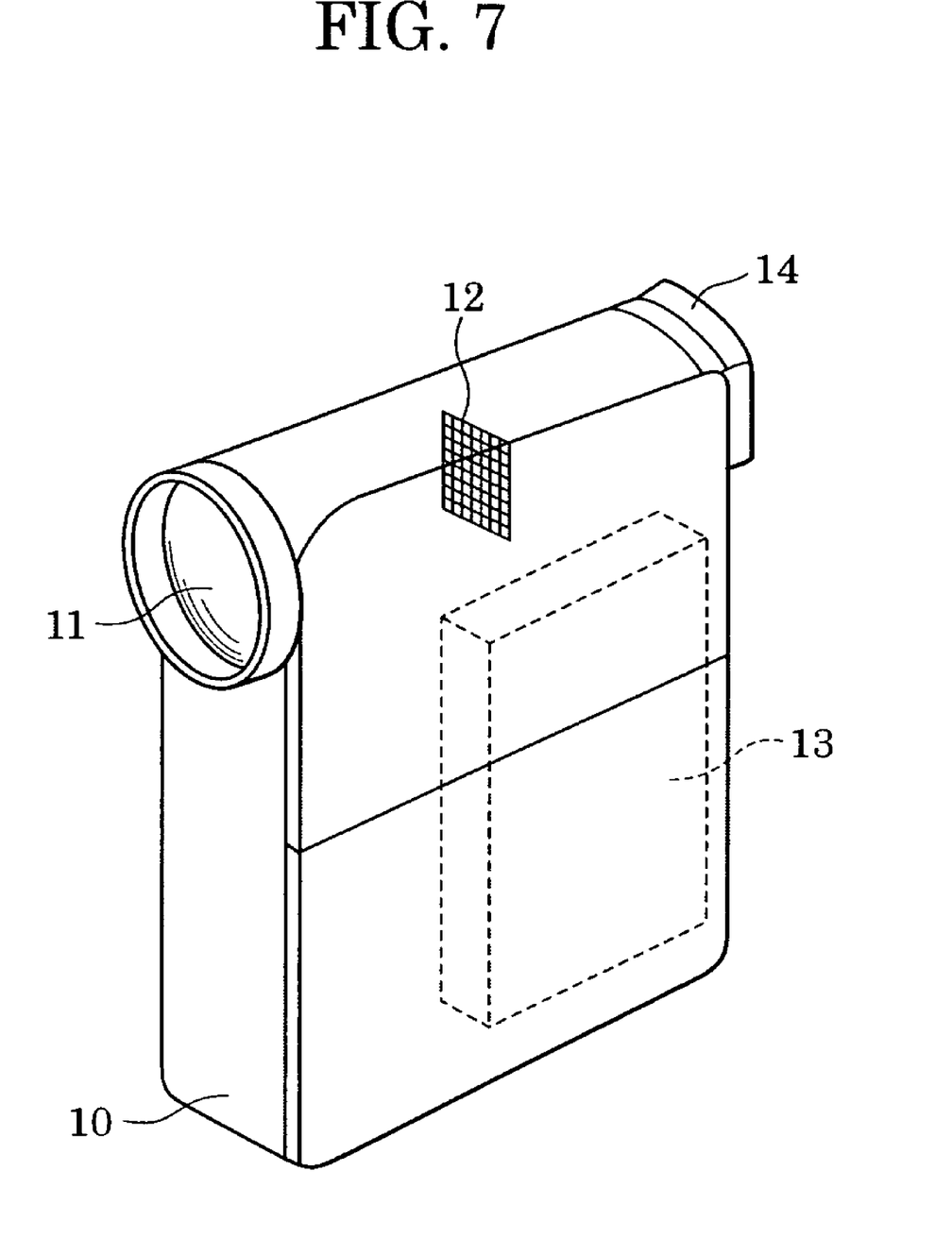
FIG. 7 illustrates an overview of the main parts of a video camera.

Exemplary embodiments can be used in various optical systems (e.g. those employing a zoom function). An example in accordance with at least one exemplary embodiment is illustrated in FIG. 7. The optical apparatus, illustrated in FIG. 7, includes a zoom lens in accordance with at least one exemplary embodiment.

FIG. 7 illustrates a camera body 10, a photographic optical system 11 comprising the zoom lens system in accordance with at least one exemplary embodiment, , an imaging device 12 (e.g. a solid-state imaging device such as a photoelectric transducer, a CCD sensor or a metal-oxide semiconductor (MOS) sensor, or other devices as known by one of ordinary skill or relevant equivalents) for receiving the image of an object formed by the photographing optical system 11, a memory 13 for recording data corresponding to the image of an object received by the imaging device 12, and a viewfinder 14 (e.g. formed of a liquid crystal display panel, equivalents, or other viewfinders as know by one skilled in the art) to view the image displayed on a displaying element, (e.g. such as an optical view finder or a liquid crystal panel, equivalents, or other displaying elements as known by one of ordinary skill).

In at least one use of an exemplary embodiment, a zoom lens system in accordance with at least one exemplary embodiment can reduce the size of an image pickup apparatus, (e.g. a video camera, video projector, television camera, other devices that use zooming lens units), while maintaining high optical performance.

While the present invention has been described with reference to exemplary embodiments, it is to be understood that the invention is not limited to the disclosed embodiments and/or examples. On the contrary, the invention is intended to cover various modifications and equivalent arrangements. The scope of the following claims is to be accorded the broadest interpretation so as to encompass all such modifications and equivalent structures and functions.

This application claims priority from Japanese Patent Application No. 2004-161584 filed May 31, 2004, which is hereby incorporated herein in its entirety.

What is claimed is:

1. A zoom lens system comprising:
a first lens unit having a positive optical power;
a second lens unit having a negative optical power, the second lens unit being disposed on the image side of the first lens unit and having at least one negative lens and at least one positive lens;
a third lens unit having a positive optical power, the third lens unit being disposed closer to the image than the second lens unit;
a fourth lens unit having a positive optical power, the fourth lens unit being disposed closer to the image than the third lens unit; and
an aperture stop being disposed closer to the image than the second lens unit,
wherein the distance between the first and second lens units, the distance between the second and third lens unit and the distance between the third and fourth lens unit changes during zooming of the zoom lens system, and
wherein $L/S<0.85$ and $v2p<21.9$ where L represents the distance between the surface on the image side of a positive lens having the strongest optical power among positive lenses included in the second lens unit and the surface of a lens closest to the object among lenses included in the third lens unit at the telephoto end, S represents the distance between the surface on the image side of the positive lens having the strongest optical power among the positive lenses included in the second lens unit and the aperture stop at the telephoto end, and v2p represents the Abbe number of the positive lens having the strongest optical power among the lenses included in the second lens unit.

2. The zoom lens system according to claim 1, wherein the third lens unit comprises two positive lenses and one negative lens.

3. The zoom lens system according to claim 2, wherein the third lens unit comprises, in order from the object side to the image side of the zoom lens system, a positive lens, a negative lens, and a positive lens.

4. The zoom lens system according to claim 1, wherein the zoom lens system forms an image on a photoelectric transducer.

5. A zoom lens system comprising:
a first lens unit having a positive optical power;
a second lens unit having a negative optical power, the second lens unit including three negative lenses and one positive lens;
a third lens unit having a positive optical power; and
a fourth lens unit having a positive optical power,
wherein the first to fourth lens units are disposed in order from the object side to the image side of the zoom lens system,
wherein the distance between the first and second lens units, the distance between the second and third lens units and the distance between the third and fourth lens units changes during zooming of the zoom lens system, and
wherein $-1.7<f2p/f2n<-0.45$ and $v2p<21.9$ where f2n represents the focal length of a negative lens having the strongest optical power among negative lenses included in the second lens unit, f2p represents the focal length of a positive lens having the strongest optical power among positive lenses included in the second lens unit, and v2p represents the Abbe number of the positive lens having the strongest optical power among the positive lenses included in the second lens unit.

6. The zoom lens system according to claim 5, wherein the third lens unit comprises two positive lenses and one negative lens.

7. The zoom lens system according to claim 6, wherein the third lens unit comprises, in order from the object side to the image side of the zoom lens system, a positive lens, a negative lens, and a positive lens.

8. The zoom lens system according to claim 5, wherein the zoom lens system forms an image on a photoelectric transducer.

9. A zoom lens system comprising:
a first lens unit having a positive optical power;
a second lens unit having a negative optical power;
a third lens unit having a positive optical power, the third lens unit including a positive lens and a negative lens; and
a fourth lens unit having a positive optical power;
wherein the first to fourth lens units are disposed in order from the object side to the image side of the zoom lens system,
wherein the distance between the first and second lens units, the distance between the second and third lens units and the distance between the third and fourth lens units changes during zooming of the zoom lens system, and
wherein $-1.5<f3p/f3n<-0.35$ and $v3n<21.9$ where f3p represents the focal length of a positive lens having the strongest optical power among positive lenses included in the third lens unit, f3n represents the focal length of a negative lens having the strongest optical power among negative lenses included in the third lens unit, and ν3n represents the Abbe number of the negative lens having the strongest optical power among the lenses included in the third lens unit.

10. The zoom lens system according to claim 9, wherein the third lens unit comprises two positive lenses and one negative lens.

11. The zoom lens system according to claim 10, wherein the third lens unit comprises, in order from the object side to the image side of the zoom lens system, a positive lens, a negative lens, and a positive lens.

12. The zoom lens system according to claim 9, wherein the zoom lens system forms an image on a photoelectric transducer.

13. An image pickup apparatus comprising:
a zoom lens system according to claim 1; and
a photoelectric transducer for receiving light of an image formed by the zoom lens system.

14. An image pickup apparatus comprising:
a zoom lens system according to claim 5; and
a photoelectric transducer for receiving light of an image formed by the zoom lens system.

15. An image pickup apparatus comprising:
a zoom lens system according to claim 9; and
a photoelectric transducer for receiving light of an image formed by the zoom lens system.

* * * * *